(12) United States Patent
Huh et al.

(10) Patent No.: US 9,017,572 B2
(45) Date of Patent: *Apr. 28, 2015

(54) LIQUID CRYSTAL DISPLAY AND METHOD OF MANUFACTURING THE SAME

(71) Applicant: Samsung Display Co., Ltd, Yongin, Gyeonggi-Do (KR)

(72) Inventors: Soojeong Huh, Yongin-si (KR); NamSeok Lee, Suwon-si (KR); Won-Gap Yoon, Suwon-si (KR); Soyoun Park, Suwon-si (KR); Si-Heun Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,963

(22) Filed: Sep. 9, 2013

(65) Prior Publication Data

US 2014/0008574 A1 Jan. 9, 2014

Related U.S. Application Data

(63) Continuation of application No. 12/778,926, filed on May 12, 2010, now Pat. No. 8,530,007.

(30) Foreign Application Priority Data

Sep. 7, 2009 (KR) .......... 10-2009-0084034

(51) Int. Cl.

| | |
|---|---|
| *C09K 19/12* | (2006.01) |
| *C09K 19/30* | (2006.01) |
| *C09K 19/06* | (2006.01) |
| *C09K 19/52* | (2006.01) |
| *C09K 19/00* | (2006.01) |
| *C09K 19/08* | (2006.01) |
| *C09K 19/20* | (2006.01) |
| *C09K 19/44* | (2006.01) |
| *G02F 1/139* | (2006.01) |
| *C09K 19/04* | (2006.01) |
| *G02F 1/1362* | (2006.01) |
| *G02F 1/137* | (2006.01) |

(52) U.S. Cl.
CPC ............... *C09K 19/08* (2013.01); *C09K 19/20* (2013.01); *C09K 19/3066* (2013.01); *C09K 19/44* (2013.01); *C09K 2019/0466* (2013.01); *C09K 2019/123* (2013.01); *C09K 2019/124* (2013.01); *C09K 2019/301* (2013.01); *C09K 2019/3012* (2013.01); *C09K 2019/3016* (2013.01); *G02F 1/136213* (2013.01); *G02F 1/13718* (2013.01); *G02F 1/1396* (2013.01); *C09K 19/12* (2013.01)

(58) Field of Classification Search
USPC ............... 252/299.01, 299.6, 299.63, 299.66; 428/1.1, 1.3
See application file for complete search history.

(56) References Cited

U.S. PATENT DOCUMENTS

| | | | |
|---|---|---|---|
| 7,300,692 B2 | 11/2007 | Hirota et al. | |
| 7,390,538 B2 | 6/2008 | Manabe et al. | |
| 8,054,428 B2 | 11/2011 | Song et al. | |
| 8,530,007 B2 * | 9/2013 | Huh et al. | ............... 428/1.1 |
| 2008/0074605 A1 | 3/2008 | Huh et al. | |

FOREIGN PATENT DOCUMENTS

| | | |
|---|---|---|
| CN | 1615453 A | 5/2005 |
| CN | 1823151 A | 8/2006 |

* cited by examiner

*Primary Examiner* — Geraldina Visconti
(74) *Attorney, Agent, or Firm* — Innovation Counsel LLP (57) ABSTRACT

A liquid crystal display includes a first substrate, a second substrate, and a liquid crystal layer. The first substrate includes a first insulating substrate, in which a pixel area is defined, a gate line formed on the first insulating substrate, a data line crossing the gate line, and a thin film transistor connected to the gate line and the data line. The second substrate is opposite to the first substrate. The liquid crystal layer is interposed between the first and second substrates and includes a liquid crystal composition with a nematic-isotropic phase transition temperature (Tni) of 79° C. or above.

20 Claims, 4 Drawing Sheets

LIQUID CRYSTAL DISPLAY AND METHOD OF MANUFACTURING THE SAME

CROSS-REFERENCE TO RELATED APPLICATION

This application is a continuation application of U.S. patent application Ser. No. 12/778,926 filed on May 12, 2010, which claims priority to Korean Patent Application No. 10-2009-0084034 filed on Sep. 7, 2009, and all the benefits accruing therefrom under 35 U.S.C. §119, the contents of the prior applications being herein incorporated by reference

BACKGROUND

1. Field of the Invention

The present invention relates to a liquid crystal display and a method of manufacturing the same.

2. Description of the Related Art

A liquid crystal display includes a liquid crystal layer interposed between two substrates. The liquid crystal display is provided with electrodes which are formed on the substrates. The liquid crystal layer includes liquid crystal molecules. The alignment of the liquid crystal molecules is changed according to the electric field generated by the electrodes. Changing the alignment of the liquid crystal molecules adjusts the quantity of light passing through the liquid crystal display. Accordingly, an image is displayed.

Display apparatuses employing liquid crystal displays have been extensively used in devices such as mobile phones, personal digital assistants, personal computers, and televisions. The liquid crystal displays are often specifically developed to be suitable for use in the particular devices in which they are employed.

Recently, the use of portable device, including portable notebook computers has been increasing. Such devices require superior mobile convenience, and thus there is demand for liquid crystal displays that satisfy the requirements of low power consumption and high response speed.

SUMMARY

The present invention relates to a liquid crystal display having improved display quality.

The present invention also relates to a method of manufacturing the liquid crystal display.

In one aspect, the liquid crystal display includes first and second substrates opposite to each other and a liquid crystal layer interposed between the first and second substrates. The first substrate includes a first insulating substrate comprising a pixel area, a gate line on the first insulating substrate, a data line crossing the gate line, and a thin film transistor connected to the gate line and the data line. The liquid crystal layer comprises a liquid crystal composition which includes 31 weight % to 48 weight % of a neutral liquid crystal comprising at least one compound selected from the group of compounds represented by formula 1 below, 8.5 weight % to 18 weight % of first polar liquid crystal comprising at least one compound selected from the group of compounds represented by formula 2 below, and 42 weight % to 51 weight % of second polar liquid crystal comprising at least one compound selected from the group of compounds represented by formula 3 below.

[Formula 1]

[Formula 2]

[Formula 3]

In the case of the compounds of formula 1, formula 2 and formula 3, X is an alkyl, alkoxy, or alkenyl group having two to five carbon atoms, and Y is an alkyl or alkenyl group having two to five carbon atoms.

The liquid crystal composition has a nematic-isotropic phase transition temperature (Tni) of 79° C. or above. The liquid crystal composition includes a cholesteric liquid crystal composition. The cholesteric liquid crystal composition includes a chiral liquid crystal having a pitch of about 50 μm to about 70 μm. The liquid crystal composition has positive dielectric anisotropy in a range of about 8 to about 15. A driving voltage of about 3.0 V to about 3.6 V may be applied to the liquid crystal layer.

The data line formed on the first substrate has a thickness of 1500 Å or less. The data line may include aluminum (Al).

A protective layer is formed on the first insulating substrate, the gate line, the data line, and the thin film transistor. The protective layer may have a raised portion with a height of about 1400 Å or less on an area where the data line is disposed. The raised portion has a flat top surface and inclined lateral sides, and an angle between at least one of the lateral sides and a straight line perpendicular to the flat top surface is in a range of about 50° to about 70°.

In another aspect, a pixel electrode is provided in the pixel area of the first substrate. The pixel electrode is connected with a drain electrode of the thin film transistor. A storage line spaced apart from the gate line is provided on the first insulating substrate. A storage electrode branches from the storage line to partially overlap with the pixel electrode and the data line. A gate insulating layer is interposed between the data line and the storage electrode.

In still another aspect, a pixel electrode is provided in the pixel area of the first substrate. The pixel electrode is connected with a drain electrode of the thin film transistor. First and second floating storage electrodes are provided on the first insulating substrate. First and second floating storage electrodes are spaced apart from the gate line. The first and second floating storage electrodes partially overlap with the pixel electrode, respectively, and are spaced apart from each other with the data line interposed between the floating electrodes when viewed in a plan view. A gate insulating layer is formed on the gate line, and the first and second floating storage electrodes are formed on the gate insulating layer.

The liquid crystal display is manufactured by forming first and second substrate, and inserting a liquid crystal layer including a liquid crystal composition between the two substrates.

A gate line, a data line crossing the gate line to define a pixel area, and a thin film transistor connected to the gate line and the data line are formed on a first insulating substrate. Then, a first alignment layer is formed on the first insulating substrate having the thin film transistor, and the first alignment layer is rubbed to form the first substrate. The second substrate is formed by forming a second alignment layer on a second insulating substrate and rubbing the second alignment layer.

The data line has a height of 1500 Å or less.

A protective layer, which has a raised portion with a height of 1400 Å or less over the data line, is formed on the first insulating substrate. The raised portion on the data line has a flat top surface and inclined lateral sides, and an angle between at least one of the lateral sides and a straight line perpendicular to the flat top surface is in a range of about 50° to about 70°.

The first and second alignment layers are rubbed with a rubbing roll rotated at a rate of about 1500 rpm to about 2000 rpm, and a rubbing depth of the rubbing roll from a surface of the first and second alignment layers may be in a range of about 0.20 mm to about 0.30 mm.

The rubbing roll is wound with a rubbing cloth. The rubbing cloth includes a ground cloth formed by warps and wefts or a cloth having a filing yarn woven in a direction of the warp of the ground cloth.

The liquid crystal display as disclosed herein has reduced domain defects, thereby improving display quality. The liquid crystal display is manufacture through the method disclosed herein.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, a liquid crystal display and method of manufacturing the same according to exemplary embodiments will be described with reference to accompanying drawings.

However, the present invention is not limited to the following embodiments but includes various applications and modifications. Therefore, the scope of the present invention should not be limited to the following embodiments. In addition, the size of the layers and regions of the attached drawings along with the following embodiments are simplified or exaggerated for precise explanation or emphasis, and the same reference numeral represents the same component.

Figure 1:
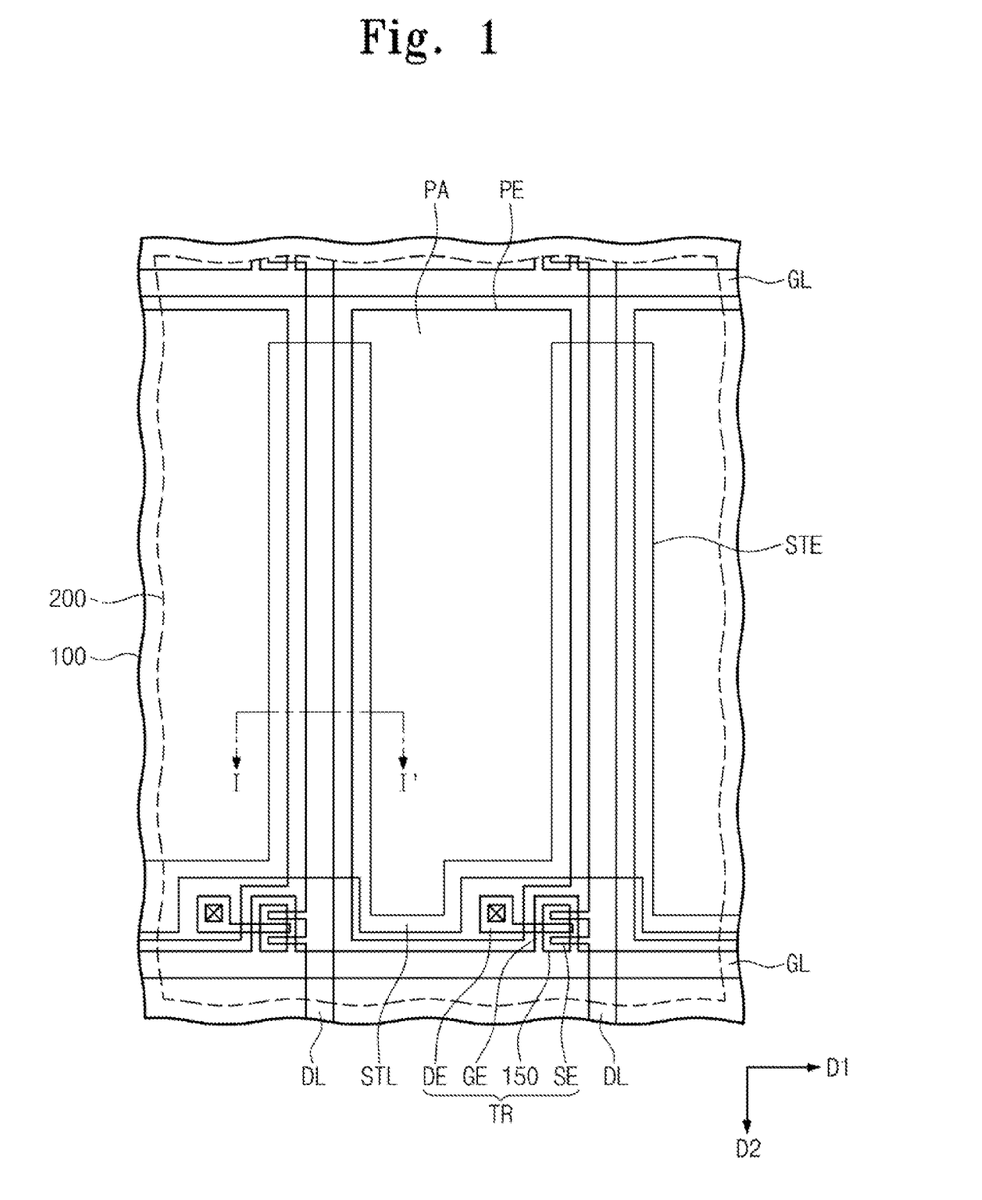
FIG. 1 is a plan view showing a liquid crystal display according to a first embodiment.
Figure 2:
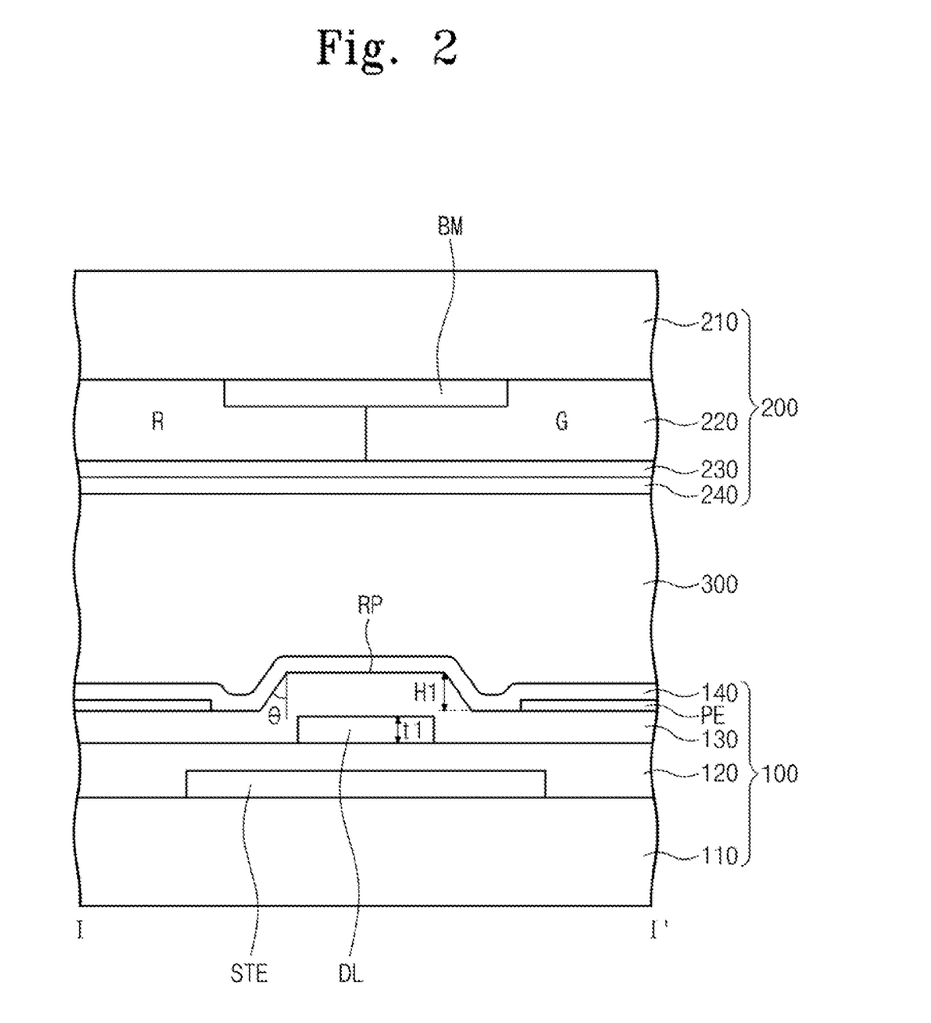
FIG. 2 is a sectional view taken along line I-I' of FIG. 1.

FIG. 1 is a plan view showing a liquid crystal display according to a first embodiment, and FIG. 2 is a sectional view taken along line I-I' of FIG. 1.

Referring to FIGS. 1 and 2, the liquid crystal display includes a first substrate 100, a second substrate 200 opposite to the first substrate 100, and a liquid crystal layer 300 interposed between the first and second substrates 100 and 200, respectively.

The first substrate 100 includes a first insulating substrate 110 which has a plurality of pixel areas PAs. Gate lines GLs and data lines DLs that cross the gate lines GLs are disposed on the first insulating substrate 110 to define pixel areas PAs. For the purpose of explanation, FIGS. 1 and 2 show a single pixel area having one gate line GL and one data line DL together with a portion of an adjacent pixel area. Because all of the pixel areas PAs in the liquid crystal display have substantially the same structure, only the one pixel area shown in FIGS. 1 and 2 will be described below, for convenience of explanation.

Referring to FIG. 1, the first insulating substrate 110 is provided thereon with the gate line GL, the data line DL, a thin film transistor TR, a pixel electrode PE, a storage line STL, and a storage electrode STE.

The gate line GL extends in a first direction D1, and the data line DL extends in a second direction D2 perpendicular to the first direction D1.

The thin film transistor TR includes a gate electrode GE branching from the gate line GL, an active pattern 150 formed over the gate electrode GE, a source electrode SE branching from the data line DL to overlap with the active pattern 150, and a drain electrode DE spaced apart from the source electrode SE. The drain electrode DE overlaps with the active pattern 150.

The pixel area PA is provided with the pixel electrode PE. The pixel electrode PE is connected to the drain electrode DE.

The storage line STL extends substantially in the first direction D1. In addition, the storage line STL is spaced apart from the gate line GL and is adjacent to the gate line GL.

The storage electrode STE branches from the storage line SL to extend in the second direction D2. The storage electrode STE overlaps with a portion of the pixel electrode PE and the data line DL. In more detail, the storage electrode STE overlaps with a portion of each of pixel electrodes PE adjacent to and spaced apart from each other, and overlaps with the data line DL, which is between the two adjacent pixel electrodes PE. The portion of the pixel electrodes PE that the storage electrode STE overlaps is typically along the length of an edge section of the pixel electrode PE in the D2 direction. Accordingly, the storage electrode STE forms a storage capacitor together with each pixel electrode PE.

The storage electrode STE blocks light that travels from underneath the first insulating substrate 110 toward the liquid crystal layer, so that such light does not pass through the liquid crystal layer that is over the storage electrode STE and data line DL. Therefore, the size of the area of a black matrix that is formed on the second substrate 200 in order to block light can be reduced. Thus the aperture ratio of the liquid crystal display is improved.

Referring to FIG. 2, the storage electrode STE is provided on the first insulating substrate 110, and a gate insulating layer 120 is provided on the storage electrode STE. The data line DL is provided on the gate insulating layer 120. The data line DL overlaps with the storage electrode STE.

A protective layer 130 is disposed on the data line DL. The pixel electrodes PE are formed on the protective layer 130 such that portions of the pixel electrodes PE adjacent to each other overlap with the storage electrode STE.

A first alignment layer 140 is provided on the protective layer 130 and the pixel electrode PE, which is formed on the protective layer 130. The first alignment layer 140 adjusts the pre-tilt angle of liquid crystal molecules existing in the liquid crystal layer 300.

As shown in FIG. 2, the data line DL has a predetermined thickness t1. The term "thickness" refers to a height (distance) from a top surface of a layer on which an element is formed to a top surface of the element itself. According to the first embodiment of the present invention, the thickness t1 of the data line DL may be 1500 Å or less. The data line DL is made of a conductive material. The data line DL may include a metal or a metal alloy and include a single layer or a multi-layer. The metal may include aluminum (Al) or chromium (Cr).

The protective layer 130 has a raised portion RP that protrudes by a predetermined thickness H1 as a result of the thickness t1 of the data line DL.

The raised portion RP of the protective layer 130 on the data line DL may have the thickness H1 of about 1400 Å or less. In addition, in order to offset a height of the raised portion RP of the protective layer 130, the storage electrode STE may have a thickness of about 1200 Å or less.

The raised portion RP on the data line DL has a flat top surface and inclined lateral sides, and an angle θ between one of the lateral sides and a straight line perpendicular to the flat top surface may be about 50° to about 70°.

The data line DL and the raised portion RP of the protective layer 130 have thicknesses of about 1500 Å or less and about 1400 Å or less, respectively. If the height of the raised portion RP on the data line DL exceeds a predetermined value, for example, if the height is over 4000 Å, the alignment layer 140 is not formed uniformly in the raised portion RP. While not wishing to be bound by any theory, it is understood that an alignment layer interacts with the liquid crystal molecules in the liquid crystal layer at the surface of the alignment layer to align the orientation of the liquid crystal molecules, and create what is referred to as a "pre-tilt angle." The "pre-tilt angle" is the angle of orientation of the liquid crystal molecules, and is typically the angle between the long axis of the liquid crystal molecules and the surface of the alignment layer. The pre-tilt angle determines gray scale contrast in liquid crystal displays. After an alignment layer is formed, it undergoes a rubbing process, which is believed to create the surface properties on the alignment layer necessary to properly orient the liquid crystal molecules to the pre-tilt angle. Thereafter, the lateral sides of the raised portion RP may not be aligned when an alignment layer rubbing process to form a pre-tilt angle is performed. Since the lateral sides of the raised portion has no or insufficient alignment force for the liquid crystal, light leakage may occur.

The description of the embodiment has focused on the raised portion RP on the data line DL. However, the same principles may be applied, for example, to the gate line GL. A raised portion on the gate line GL may have a thickness equal to or less than the thickness of the raised portion RP on the data line DL. For example, the raised portion on the gate line may have a thickness of about 1200 Å for the same reasons described above with respect to the raised portion RP on the data line DL. A black matrix BM is formed on a second insulating substrate 210 to block light. Red and green color filters R and G are formed on the black matrix BM corresponding to the pixel areas PA, respectively. Although the red and green color filters R and G are shown in FIG. 2, a blue color filter (not shown) is typically also formed on the second insulating substrate 210 in addition to the red and green color filters R and G.

A common electrode 230 is formed on the red and green color filters R and G. The common electrode 230 faces the pixel electrode PE, and, together with the pixel electrode PE, forms an electric field.

A second alignment layer 240 is formed on the common electrode 230 to control the pre-tilt angle of the liquid crystal layer 300.

With respect to the liquid crystal layer 300, according to one embodiment, low power consumption in the liquid crystal display device is achieve through the use of a liquid crystal composition having high dielectric anisotropy, such that the liquid crystal display can be driven at a low driving voltage.

The liquid crystal composition includes at least one liquid crystal compound selected from the compounds in each group of the following formulas 1 to 3, respectively. Formula 1 represents a neutral liquid crystal corresponding to 31 weight % to 48 weight % of the whole liquid crystal composition. Formula 2 represents a first polar liquid crystal corresponding to 8.5 weight % to 18 weight % of the whole liquid crystal composition. Formula 3 represents a second polar liquid crystal corresponding 42 weight % to 51 weight % of the whole liquid crystal composition. The first polar liquid crystal has a polarity greater than that of the second polar liquid crystal.

wherein X is an alkyl, alkoxy, or alkenyl group having 2 to 5 carbon atoms, and Y is an alkyl or alkenyl group having 2 to 5 carbon atoms.

The liquid crystal composition has a nematic-isotropic phase transition temperature (Tni) of 79° C. or more. The liquid crystal composition has positive dielectric anisotropy of about 8 to about 15. A driving voltage of about 3.0 V to about 3.6 V is preferably applied to the pixel electrode PE in order to drive the liquid crystal layer 300. The on/off response speed of the liquid crystal layer may be about 16 ms or less.

According to the one embodiment of the present invention, the liquid crystal composition may include a cholesteric liquid crystal composition having chiral dopants. In this case, the pitch of the cholesteric liquid crystal may be about 50 μm to about 70 μm.

The liquid crystal display having the structure described is driven when a common voltage is supplied to the common electrode 230, and a pixel signal from the data line DL is supplied to the pixel electrode PE in response to a scan signal supplied from the gate line GL. As a result, an electric field is formed between the common electrode 230 and the pixel electrode PE, and the liquid crystal is rotated by the electric field to change the transmittance of light through the liquid crystal display, resulting in an image being displayed.

According to one embodiment, the thickness t1 of the data line DL is reduced such that the height H1 of the raised portion RP is optimized with respect to the alignment layer and the liquid crystal composition. Accordingly, the height H1 of the raised portion RP of the protective layer 130 is reduced, so that misalignment of the liquid crystal layer 300 is reduced. In addition, the lateral sides of the raised portion RP are formed at an inclination angle of about 50° to about 70°, so that defects caused by rubbing are reduced.

In addition, according to the present embodiment, since the liquid crystal composition having a high Tni of 79° C. or more is used, misalignment of the liquid crystal molecules may be reduced at high temperatures, for example, temperatures over 80° C. However, since the liquid crystal composition having high dielectric anisotropy and high Tni has a smaller pre-tilt angle than other liquid crystal compositions, liquid crystal molecules of the composition may not return to their original positions upon the application, or non-application, of the electric field. Also according to the present embodiment, even though defects can occur at the raised portion RP, since the thickness of the data line DL and/or the protective layer 130 on the data line DL is adjusted in the present embodiment, such defects are reduced, and the driving of the liquid crystal composition is facilitated.

Figure 3:
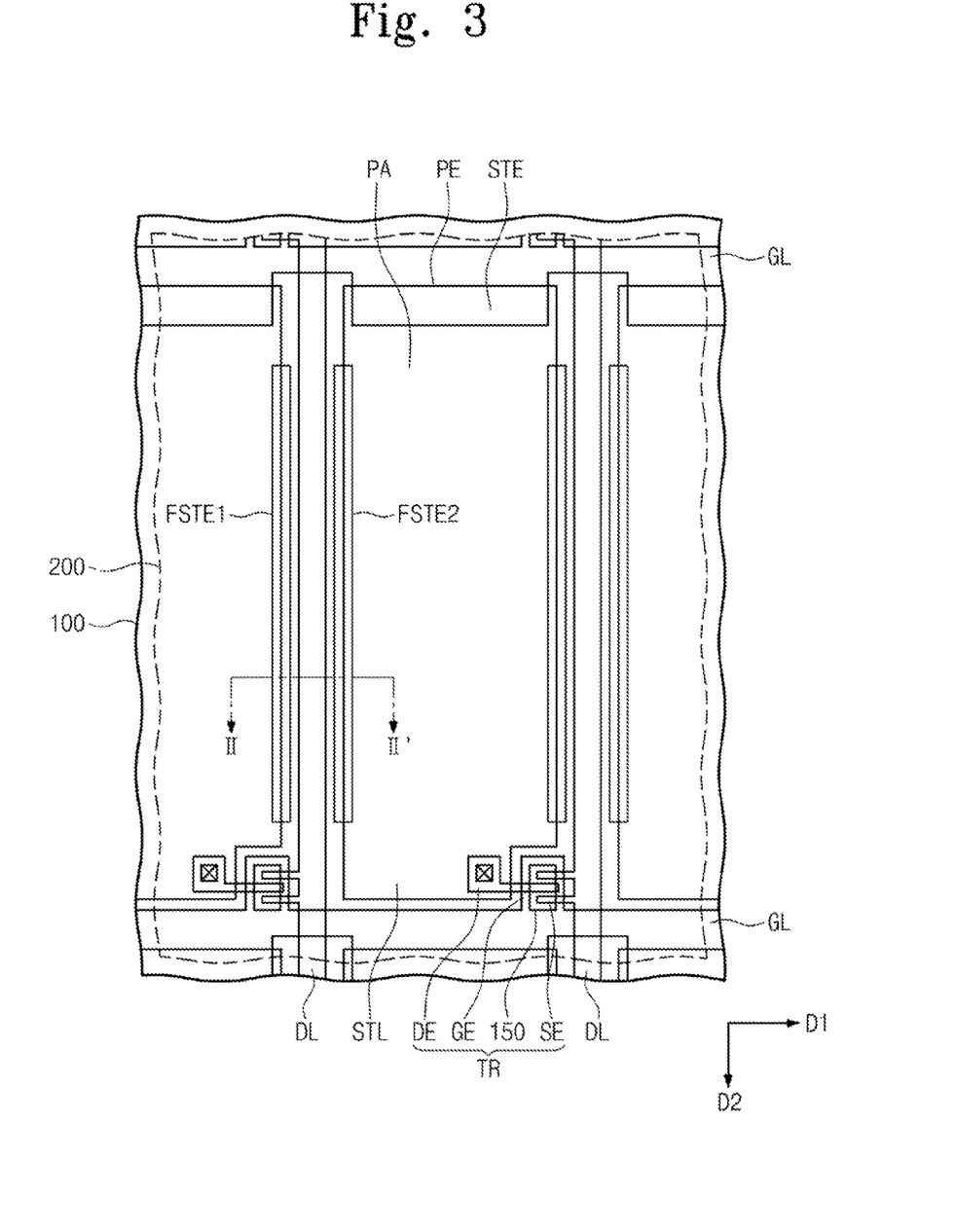
FIG. 3 is a plan view showing a liquid crystal display according to a second embodiment.
Figure 4:
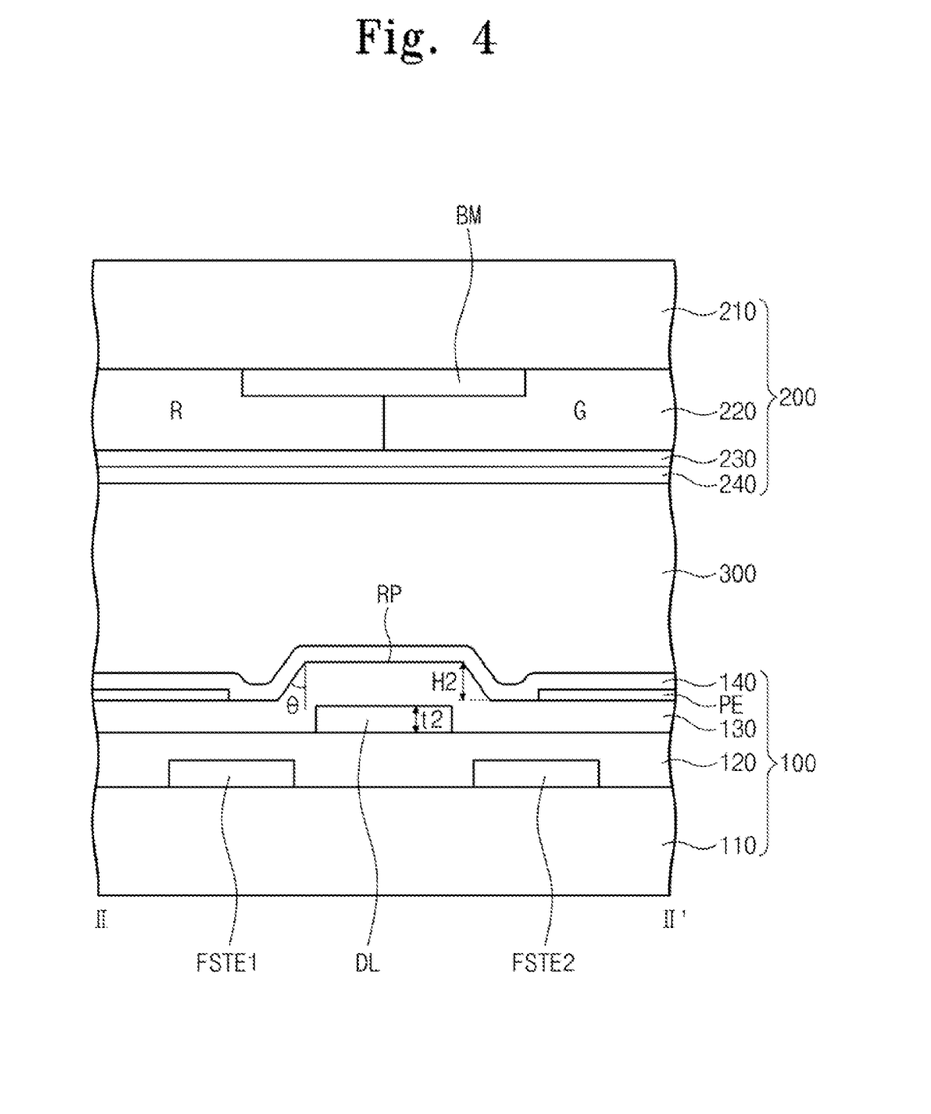
FIG. 4 is a sectional view taken along line II-II' of FIG. 3.

FIG. 3 is a plan view showing a liquid crystal display according to a second embodiment of the present invention, and FIG. 4 is a sectional view taken along line II-II' of FIG. 3. Hereinafter, the liquid crystal display according to the second embodiment will be described while focusing on differences between the first and second embodiments in order to avoid redundancy. The same reference numerals will be used to designate like elements between the two embodiments.

According to the second embodiment of the present invention, the storage electrode STE has a structure different from that of the first embodiment. Also, the height of the raised portion RP of the protective layer 130 is smaller than that of the first embodiment.

Referring to FIG. 3, the first insulating substrate 110 is provided thereon with the gate line GL, the data line DL, the thin film transistor TR, the pixel electrode PE, the storage electrode STE, a first floating storage electrode FSTE1, and a second floating storage electrode FSTE2.

The gate line GL extends in the first direction D1. A portion of the gate line GL protrudes into a portion of the pixel area PA below (i.e. located in the D2 direction with respect to the GL) the gate line and extends in the second direction D2 to overlap with the pixel electrode PE formed in the succeeding pixel area PA, thereby forming the storage electrode STE. The storage electrode STE forms a storage capacitor with each pixel electrode PE. The first floating storage electrode FSTE1 and the second floating storage electrode FSTE2 are disposed over a portion of the pixel electrode PE along an edge section to the pixel electrode PE in the D2 direction with the data line DL interposed between the two floating storage electrodes FSTE1 and FSTE2. The first floating storage electrode FSTE1 and the second floating storage electrode FSTE2 partially overlap with the pixel electrodes PE, respectively. The first and second floating storage electrodes FSTE1 and FSTE2 include the same material as that of the gate line GL. The first and second floating storage electrodes FSTE1 and FSTE2 are formed on the same layer as the gate line GL while being spaced apart from the gate line GL at a predetermined distance.

Referring to FIG. 4, the first and second floating storage electrodes FSTE1 and FSTE2 are formed on the first insulating substrate 110, and the gate insulating layer 120 is formed on the first and second floating storage electrodes FSTE1 and FSTE2. The data line DL is formed on the gate insulating layer 120 such that the data line DL does not overlap with the first and second floating storage electrodes FSTE1 and FSTE2.

The protective layer 130 is formed on the data line DL, and the pixel electrodes PE are formed on the protective layer 130. The first floating storage electrode FSTE1 overlaps with a portion of one of the adjacent pixel electrodes PE, and the second floating storage electrode FSTE2 overlaps with a portion of the other of the adjacent pixel electrodes PE. The pixel electrodes PE overlap with the first and second floating storage electrodes FSTE1 and FSTE2 to form capacitors, respectively. The capacitors are storage capacitors supplementing charges discharged from the liquid crystal capacitors that are formed by the pixel electrodes PE and the common electrode 230. Since the first and second floating storage electrodes FSTE1 and FSTE2 are spaced apart from the data line DL when viewed in a plan view, capacitances that are the result of parasitic capacitors formed between the first and second floating storage electrodes FSTE1 and FSTE2 and the data line DL are reduced. In addition, the first and second floating storage electrodes FSTE1 and FSTE2 block light transmitted upwardly through the display device, and thus reduce light leakage. Such light leakage is caused by a fringe field at an end portion of the pixel electrode PE due to potential difference between an area where an electric field is applied and an area wherein an electric field is not applied.

The raised portion RP of the protective layer 130 on the data line DL has a thickness H2 that varies according to a thickness t2 of the data line DL. An upper portion of the protective layer 130 on the data line DL protrudes to form the raised portion RP.

According to the second embodiment of the present invention, the data line DL may have a thickness of about 1500 Å or less, and the raised portion RP of the protective layer 130 may have a thickness of about 1400 Å or less. In order to minimize the thickness of the raised portion RP of the protective layer 130, the first and second floating storage electrodes FSTE1 and FSTE2 are formed at a thickness of about 1200 Å or less. The raised portion RP on the data line DL has a flat top surface and inclined lateral sides, and an angle θ between one of the lateral sides and a straight line perpendicular to the flat top surface may be about 50° to about 70°.

According to the second embodiment of the present invention, since the first and second floating storage electrodes FSTE1 and FSTE2 do not overlap with the data line DL, respectively, a height of the raised portion RP of the protective layer 130 is reduced as compared with that of the first embodiment. Accordingly, misalignment of liquid crystal molecules at the raised portion RP is also reduced.

The liquid crystal displays having the structure described herein are manufactured by forming the first and second substrates and interposing the liquid crystal layer including the liquid crystal compositions between the two substrates. Hereinafter, a method of manufacturing the liquid crystal display according to the first embodiment of the present invention will be described with reference to FIGS. 1 and 2. Although a method of manufacturing the liquid crystal display according to the second embodiment is not described in detail herein, one of skill in the art will understand that the liquid crystal display according to the second embodiment may be manufactured by the same process as described for the first embodiment, with the exception that, when forming the floating storage electrodes FTSE1 and FTSE2, a pattern having a different shape from that used in the first embodiment for forming the storage electrode STE is employed.

The first insulating substrate 110 is provided thereon with the gate line GL, the gate electrode GE, the storage line STL, and the storage electrode STE. The gate insulating layer 120 is formed on the first insulating substrate 110 having the gate line GL, the storage line STL, and the storage electrode STE. The gate line GL, the gate electrode GE, the storage line STL, and the storage electrode STE may be formed by depositing a conductive material on the entire surface of the first insulating substrate 110 and then patterning the resultant structure through a photolithography process. The gate line GL, the storage line STL, and the storage electrode STE may have a height of about 1200 Å or less.

Next, after depositing a semiconductor layer including amorphous silicon on the gate insulating layer 120, the resultant structure is selectively patterned, thereby forming an active layer 150.

Then, after depositing a conductive layer on the entire surface of the first insulating substrate 110, the conducive layer is patterned through a photolithography process, thereby forming the data line DL, the source electrode SE, and the drain electrode DE. The data line DL may have a thickness of about 1500 Å or less.

Subsequently, the protective layer 130 is formed on the first insulating substrate 110 and a contact hole is formed to expose a portion of the protective layer 130. The protective layer 130 is formed on the data line DL such that the raised portion RP has a height of about 1400 Å or less. The raised portion RP on the data line DL has a flat top surface and inclined lateral sides, and an angle θ between one of the lateral sides and a straight line perpendicular to the flat top surface may be about 50° to about 70°. The inclined lateral side of the raised portion RP may be formed through an etch process. For example, the inclined raised portion RP may be formed through a wet etch process. The inclination angle θ of the raised portion RP may be adjusted in the wet etch process, by altering the etching time.

Then, after depositing a transparent conductive material on the protective layer 130, the resultant structure is patterned through a photolithography process, thereby forming the pixel electrode PE, which is electrically connected with the drain line DL through the contact hole.

Next, the first alignment layer 140 is formed on the first insulating substrate 110. Then, the first alignment layer 140 is rubbed by using a rubbing roll. In this case, the first alignment layer 140 may be rubbed by rotating a rubbing roll around which the rubbing cloth is wound at a rate of about 1500 rpm (rotations per minute) to about 2000 rpm. When the rubbing roll rubs the first alignment layer 140, the rubbing roll presses the first alignment layer 140. Thus, a portion of the first alignment layer where the rubbing roll is touched becomes to be sunken partially with a certain depth, i.e. a rubbing depth. The rubbing depth made by the rubbing roll from a surface of the first alignment layer may be about 0.20 mm to about 0.30 mm. If necessary, various rubbing cloths may be employed. The rubbing cloth includes a ground cloth formed by warps and wefts or a cotton cloth having a filing yarn woven in the warp direction of the ground cloth. The filing yarn may be woven in a V shape while protruding toward a rubbing surface.

The second substrate 200 includes the second insulating substrate 210 provided thereon with the black matrix BM including an opaque material, and a color filter 220 is formed on the second insulating substrate 210 having the black matrix BM through a photolithography process. The common electrode 230 is formed on the color filter 220 by using a transparent conductive material, and the second alignment layer 240 is formed on the common electrode 230. Thereafter, the second alignment layer 240 is rubbed by using the rubbing roll in a process as described above for alignment layer 140, thereby manufacturing the second substrate 200.

The liquid crystal composition is interposed between the first and second substrates 100 and 200 to form the liquid crystal layer 300.

As described herein, the liquid crystal display of the embodiments includes a liquid crystal composition having a high Tni that is used with a substrate that has a raised portion of predetermined thickness and shape, so that the liquid crystal display of the embodiments has a reduced defect rate. The following Table 1 lists the results of a defect evaluation performed on a number of liquid crystal displays. Each of the liquid crystal displays used for the evaluation was formed with a substrate including a raised portion as described in the first embodiment, and employs aliquid crystal composition according to either (i) the conventional, related art or (ii) the embodiments of the present invention. The first two columns of Table 1 list the composition, properties and defect rates for a first and second comparative example having conventional liquid crystal compositions with Tnis of 75° C. or less. The remaining columns list the composition, properties and defect rates for six liquid crystal compositions according to the present embodiments.

In Table 1, the rows labeled "defect evaluation" show the number of liquid crystal displays having defects after the liquid crystal displays have been stored at a temperature of 80° C. for 48 hours and then slowly cooled down in the oven for 12 hours from 80° C. to a room temperature. The liquid crystal displays used in the defect evaluation have about 5000 pixel areas PA. If defects occur in 1000 or more from among about 5000 pixel areas PA, the liquid crystal display is regarded as defective. The rows labeled "defect evaluation" show the number of liquid crystal displays having defects from among total liquid crystal displays that were tested. For example, an entry of "10/10" indicates that defects occur in all of ten liquid crystal displays having the liquid crystal composition listed in the column tested, and "3/10" represents that defects occur in three from among the ten liquid crystal displays tested. Defect evaluations were performed five times for each liquid crystal composition on the number of liquid crystal displays indicated by the entry.

For reference, the column labeled "V10" of "V-T curve" indicates the driving voltage applied to the liquid crystal display to a point in which transmittance becomes 10%, "V50" represents a driving voltage applied to the liquid crystal display to a point in which transmittance becomes 50%, and "V90" represents a driving voltage applied to the liquid crystal display to a point in which transmittance becomes 90%.

TABLE 1

| | | Comparative Example 1 of liquid crystal composition | Comparative Example 2 of liquid crystal composition | Liquid crystal composition 1 | Liquid crystal composition 2 | Liquid crystal composition 3 | Liquid crystal composition 4 | Liquid crystal composition 5 | Liquid crystal composition 6 |
|---|---|---|---|---|---|---|---|---|---|
| Liquid crystal (weight %) | Neutral liquid crystal | 35 | 41 | 32 | 31 | 39.5 | 40 | 45 | 48 |
| | $1^{st}$ polar liquid crystal | 15 | 16 | 18 | 18 | 10 | 10 | 8.5 | 10 |
| | $2^{nd}$ polar liquid crystal | 50 | 43 | 50 | 51 | 50.5 | 50 | 46.5 | 42 |
| Physical Property | Tni | 74.4 | 74.6 | 80.2 | 80.1 | 79.5 | 80.5 | 80 | 79.5 |
| | Refractive index ($\Delta n$) | 0.102 | 0.1031 | 0.113 | 0.114 | 0.1154 | 0.1134 | 0.113 | 0.1126 |
| | Dielectric anisotropy ($\Delta\epsilon$) | 11.4 | 12.7 | 13.0 | 12.7 | 13.8 | 14.0 | 14.1 | 14.0 |
| | Rotational viscosity (mPa·s) | 78.9 | 82 | 100.9 | 100.9 | 97 | 99 | 92 | 91 |
| V-T Curve (V) | V10 | 1.12 | 1.08 | 1.12 | 1.23 | 0.95 | 0.99 | 0.98 | 0.99 |
| | V50 | 1.45 | 1.76 | 1.47 | 1.60 | 1.67 | 1.67 | 1.64 | 1.68 |
| | V90 | 1.91 | 2.25 | 1.91 | 2.16 | 2.04 | 2.13 | 2.05 | 2.09 |
| Evaluation | Response speed (ms) | 15.6 | 15.6 | 15.7 | 15.0 | 14.0 | 14.9 | 13.4 | — |
| | Contrast ratio | 620 | 620 | 699 | 685 | 820 | 711 | 689 | — |
| Defect Evaluation | once | 3/3 | 3/3 | 0/3 | 0/3 | 1/3 | 0/10 | 0/10 | 0/10 |
| | Twice | 10/10 | — | 0/6 | 0/6 | 1/3 | — | — | — |
| | 3 times | 10/10 | — | — | 0/10 | — | 0/10 | — | — |

TABLE 1-continued

|  | Comparative Example 1 of liquid crystal composition | Comparative Example 2 of liquid crystal composition | Liquid crystal composition 1 | Liquid crystal composition 2 | Liquid crystal composition 3 | Liquid crystal composition 4 | Liquid crystal composition 5 | Liquid crystal composition 6 |
|---|---|---|---|---|---|---|---|---|
| 4 times | 10/10 | — | 1/10 | 3/10 | 0/10 | 0/10 | — | — |
| 5 times | 10/10 | — | 0/10 | — | 0/10 | — | — | — |

As shown in Table 1, liquid crystal compositions 1 to 6 having a composition ratio according to the embodiment of the present invention have Tnis of 79° C. or more. Although the liquid crystal compositions 1 to 6, which have the composition ratio according to the embodiment, have greater dielectric anisotropy and a higher response speed as compared with those of a conventional liquid crystal, liquid crystal compositions 1 to 6 have defect rates that are much less than liquid crystal compositions of the first and second comparative examples. Although Table 1 shows whether the liquid crystal display has a defect or not, in the case of liquid crystal display which did not have defects, the number of defects is less than 10 per 5000 pixel areas PA, that is, such liquid crystal displays have good quality.

Although not shown in Table 1, additional defect tests were performed on liquid crystal displays according to the embodiments The tests were performed under the conditions as described for Table 1 except that the thickness of the data line DL and the angle θ between the lateral side of the protective layer 130 and a straight line perpendicular to the flat top surface of the raised portion RP of the protective layer 130 are varied. The test results are described below as follows.

When a liquid crystal composition having Tni of 80° C. is used with liquid crystal displays in which with the data lines DL have a thickness of 2000 Å and 1500 Å, defects occurred in all of three liquid crystal displays tested in the case of the data line DL thickness of 2000 Å, and no defects occurred in the three liquid crystal displays tested in the case of the data line DL thickness of 1500 Å.

When a liquid crystal composition having Tni of 80° C. is used with liquid crystal displays in which the inclination angle θ of the protective layer 130 is 54° or 65° and the data line DL is formed at the thickness of 1500 Å, defects occurred in all three liquid crystal displays tested in the case of the 54° inclination angle θ, and no defects occurred in the three liquid crystal displays tested in the case of the 65° inclination angle θ. Although defects occur in 1000 or more from among about 5000 pixels in the case of the 54° inclination angle θ, defects occur in 10 or less from among about 5000 pixels in the case of the 65° inclination angle θ.

As described above, according to the liquid crystal display of the embodiment of the present invention, defects are reduced, so that display quality can be improved. The liquid crystal display can be made relatively easily through the manufacturing method described herein.

According to the embodiment of the present invention, when the liquid crystal composition is used for the liquid crystal display, the weakness of the liquid crystal composition for a high temperature is improved and the raised portion RP of the protective layer 130 is minimized, thereby reducing defects in each pixel area PA.

Although the exemplary embodiments=have been described, it is understood that the present invention should not be limited to these exemplary embodiments but various changes and modifications can be made by one ordinary skilled in the art within the spirit and scope of the present invention as hereinafter claimed.

What is claimed is:
1. A liquid crystal composition comprising:
31 weight % to 48 weight % of a neutral liquid crystal;
8.5 weight % to 18 weight % of a first polar liquid crystal; and
42 weight % to 51 weight % of a second polar liquid crystal which is different from the first polar liquid crystal,
wherein the second polar liquid crystal comprises at least one compound selected from the group consisting of formula 3,

[Formula 3]

and wherein X is an alkyl, alkoxy, or alkenyl group having 2 to 5 carbon atoms.

2. The liquid crystal composition of claim 1, wherein the first polar liquid crystal comprises at least one compound selected from the group consisting of formula 2,

[Formula 2]

wherein X is an alkyl, alkoxy, or alkenyl group having 2 to 5 carbon atoms.

3. The liquid crystal composition of claim 2, wherein the neutral liquid crystal comprises at least one compound selected from the group consisting of formula 1,

[Formula 1]

wherein X is an alkyl, alkoxy, or alkenyl group having 2 to 5 carbon atoms and Y is an alkyl or alkenyl group having 2 to 5 carbon atoms.

4. The liquid crystal composition of claim 1, wherein the neutral liquid crystal comprises at least one compound selected from the group consisting of formula 1,

[Formula 1]

wherein X is an alkyl, alkoxy, or alkenyl group having 2 to 5 carbon atoms and Y is an alkyl or alkenyl group having 2 to 5 carbon atoms.

5. The liquid crystal composition of claim 1, wherein the liquid crystal composition has a nematic-isotropic phase transition temperature (Tni) of 79° C. or above.

6. The liquid crystal composition of claim 1, wherein the liquid crystal composition has positive dielectric anisotropy.

7. The liquid crystal composition of claim 6, wherein the positive dielectric anisotropy is in a range of about 8 to about 15.

8. The liquid crystal composition of claim 1, wherein the liquid crystal composition comprises a cholesteric liquid crystal composition.

9. The liquid crystal composition of claim 8, wherein the cholesteric liquid crystal comprising a chiral dopant and has a pitch of about 50 μm to about 70 μm.

10. The liquid crystal composition of claim 1, wherein the liquid crystal composition is driven by a driving voltage in a range of about 3.0 V to about 3.6 V.

11. The liquid crystal composition of claim 1, wherein the liquid crystal composition has a birefringence (Δn) of about 0.1126 and above.

12. A liquid crystal composition comprising:
   31 weight % to 48 weight % of a neutral liquid crystal;
   8.5 weight % to 18 weight % of a first polar liquid crystal; and
   42 weight % to 51 weight % of a second polar liquid crystal which is different from the first polar liquid crystal,
   wherein the first polar liquid crystal comprises at least one compound selected from the group consisting of formula 2,

[Formula 2]

wherein X is an alkyl, alkoxy, or alkenyl group having 2 to 5 carbon atoms.

13. The liquid crystal composition of claim 12, wherein the neutral liquid crystal comprises at least one compound selected from the group consisting of formula 1,

[Formula 1]

wherein X is an alkyl, alkoxy, or alkenyl group having 2 to 5 carbon atoms and Y is an alkyl or alkenyl group having 2 to 5 carbon atoms.

14. The liquid crystal composition of claim 12, wherein the liquid crystal composition has a nematic-isotropic phase transition temperature (Tni) of 79° C. or above.

15. The liquid crystal composition of claim 12, wherein the liquid crystal composition has positive dielectric anisotropy.

16. The liquid crystal composition of claim 15, wherein the positive dielectric anisotropy is in a range of about 8 to about 15.

17. The liquid crystal composition of claim 12, wherein the liquid crystal composition comprises a cholesteric liquid crystal composition.

18. The liquid crystal composition of claim 17, wherein the cholesteric liquid crystal comprising a chiral dopant and has a pitch of about 50 μm to about 70 μm.

19. The liquid crystal composition of claim 12, wherein the liquid crystal composition is driven by a driving voltage in a range of about 3.0 V to about 3.6 V.

20. The liquid crystal composition of claim 12, wherein the liquid crystal composition has a birefringence ($\Delta n$) of about 0.1126 and above.

* * * * *